(12) United States Patent
Carpenter, Jr. et al.

(10) Patent No.: US 11,673,648 B2
(45) Date of Patent: Jun. 13, 2023

(54) DUCTED FAN ASSEMBLY WITH CURVED STATORS

(71) Applicant: Bell Helicopter Textron Inc., Fort Worth, TX (US)

(72) Inventors: Joseph Richard Carpenter, Jr., Kennedale, TX (US); William A. Amante, Grapevine, TX (US)

(73) Assignee: Textron Innovations toc., Providence, RI (US)

( * ) Notice: Subject to any disclaimer, the term of this patent is extended or adjusted under 35 U.S.C. 154(b) by 906 days.

(21) Appl. No.: 16/247,726

(22) Filed: Jan. 15, 2019

(65) Prior Publication Data

US 2020/0223530 A1    Jul. 16, 2020

(51) Int. Cl.
| | |
|---|---|
| *B64C 11/00* | (2006.01) |
| *B64C 11/46* | (2006.01) |
| *B64C 29/00* | (2006.01) |
| *F04D 29/54* | (2006.01) |
| *F04D 19/00* | (2006.01) |

(52) U.S. Cl.
CPC .......... *B64C 11/001* (2013.01); *B64C 11/46* (2013.01); *B64C 29/0033* (2013.01); *F04D 29/544* (2013.01); *F04D 19/002* (2013.01)

(58) Field of Classification Search
CPC ..... B64C 11/001; F04D 29/544; F04D 19/002
See application file for complete search history.

(56) References Cited

U.S. PATENT DOCUMENTS

| | | | | |
|---|---|---|---|---|
| 5,295,643 | A * | 3/1994 | Ebbert ................. | B64C 39/024 |
| | | | | 428/117 |
| 6,170,778 | B1 * | 1/2001 | Cycon ................. | B64C 39/024 |
| | | | | 244/6 |
| 6,976,653 | B2 * | 12/2005 | Perlo .................... | B64C 39/028 |
| | | | | 244/34 A |
| 8,109,802 | B2 * | 2/2012 | Chui ...................... | A63H 27/12 |
| | | | | 446/36 |
| 10,106,253 | B2 * | 10/2018 | Groninga ............... | B64C 27/28 |
| 10,781,818 | B2 * | 9/2020 | Sadi ...................... | F04D 29/646 |
| 2004/0129833 | A1 * | 7/2004 | Perlo .................... | B64C 39/024 |
| | | | | 244/70 |

(Continued)

FOREIGN PATENT DOCUMENTS

| | | |
|---|---|---|
| EP | 0661206 A1 | 7/1995 |
| EP | 1384662 A1 | 1/2004 |
| EP | 3290336 A1 | 3/2018 |

OTHER PUBLICATIONS

European Exam Report in related European Patent Application No. 20151927.9 dated Jun. 5, 2020, 7 pages.

(Continued)

*Primary Examiner* — J. Todd Newton
*Assistant Examiner* — Behnoush Haghighian
(74) *Attorney, Agent, or Firm* — Lightfoot & Alford PLLC (57) ABSTRACT

A ducted fan assembly has a central axis, a duct having an outer wall and an inner wall, a fan hub at least partially disposed on the central axis, a plurality of fan blades coupled to the fan hub, and a first stator. The first stator has a first end coupled to the inner wall, a second end coupled to the inner wall, and a hub interface disposed between the first end and the second end, wherein the hub interface is coupled to the fan hub.

14 Claims, 10 Drawing Sheets

(56) References Cited

U.S. PATENT DOCUMENTS

| | | | |
|---|---|---|---|
| 2004/0200924 A1* | 10/2004 | Clark, Jr. | A63H 27/12 244/7 B |
| 2015/0023791 A1* | 1/2015 | Sadi | F04D 29/542 29/889.7 |
| 2018/0057157 A1* | 3/2018 | Groninga | B64C 39/008 |

OTHER PUBLICATIONS

European Search Report in related European Patent Application No. 20151927.9 dated May 25, 2020, 4 pages.

\* cited by examiner

DUCTED FAN ASSEMBLY WITH CURVED STATORS

BACKGROUND

A ducted fan is a propulsive apparatus in which a plurality of propulsive fan blades are disposed within a duct. Multiple vehicles use ducted fans to generate propulsion and perform a multitude of functions. Such functions include generating forward thrust, generating lift, and generating antitorque. For example, air and sea vehicles, like the Bell X-22 and the Landing Craft Air Cushion (LCAC), respectively, use ducted fans to generate forward thrust. In some cases, vertical take off and landing (VTOL) aircraft and other air vehicles, like the Martin Jetpack, use ducted fans to generate lift. Also, several helicopter models use ducted fans, in some cases in the form of fenestrons, to generate antitorque and yaw moments during operations.

Conventional ducted fans generally comprise a duct that houses a mechanical fan at its center. During operations, the mechanical fan generates a propulsive force by using a power source to spin a plurality of propulsive fan blades. Because the mechanical fan functions within the confines of the duct, the mechanical fan must be secured in place to prevent the fan blades from striking the walls of the duct.

Conventional ducted fans use stators to provide structural support to the mechanical fan and hold it in place relative to the duct. Conventional stators are generally straight, long, narrow, and fixed at their ends to both the mechanical fan and the duct. Conventional stators tend to be radially oriented about the center of the duct but can alternatively be radially offset. The conventional stators are disposed behind the fan blades and are usually aerodynamically shaped to allow easy passage of the airflow generated by the mechanical fan.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

Figure 1A:
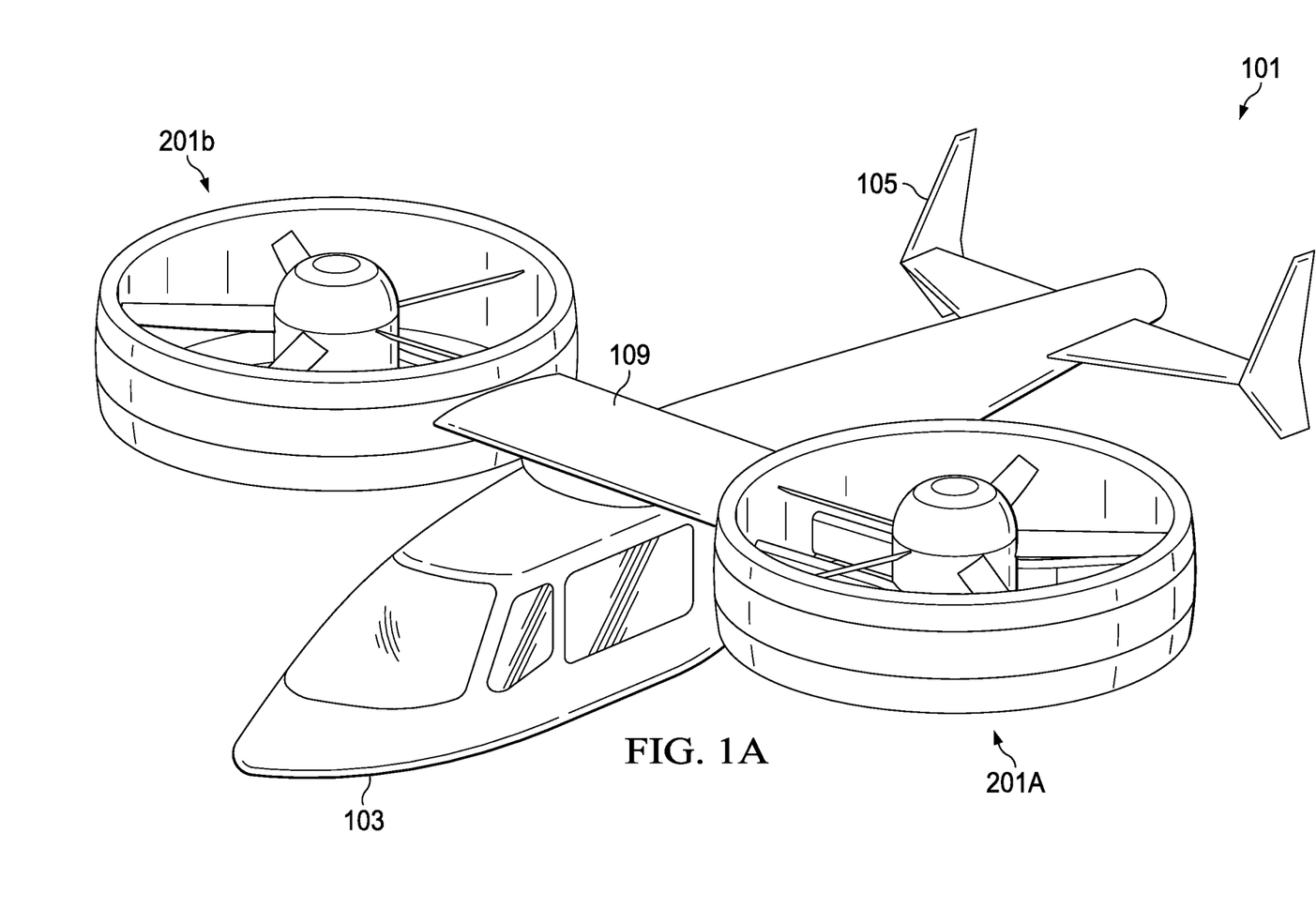
FIGS. 1A-1B show a vertical take off and landing (VTOL) aircraft with ducted fans that are oriented to primarily generate lift and forward thrust, respectively.
Figure 1B:
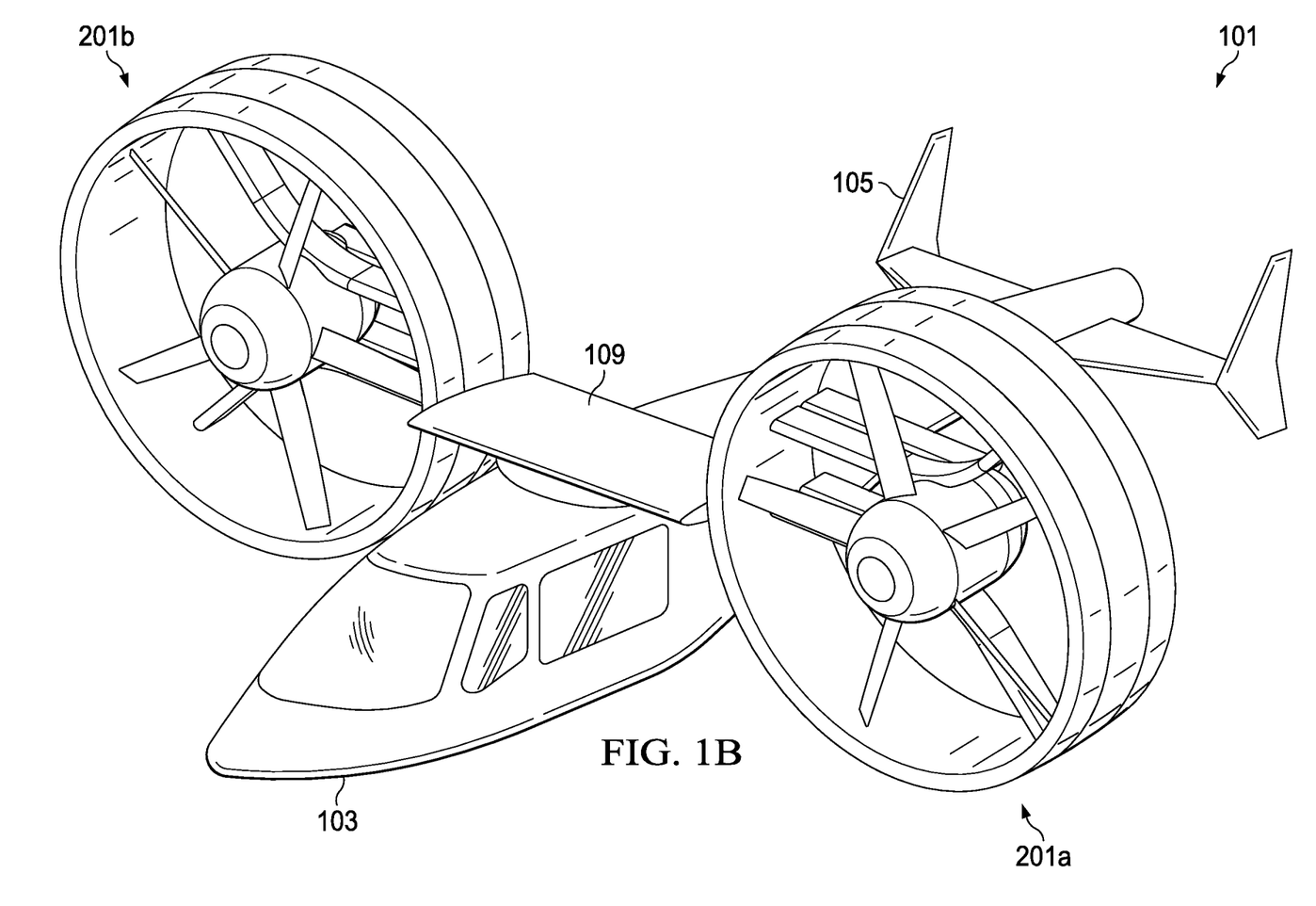

FIGS. 1A and 1B are illustrative examples of a Vertical Takeoff and Lift (VTOL) aircraft 101 comprising a fuselage 103, an empennage 105, and two ducted fan assemblies 201a and 201b that selectively pivot about a wing 109.

FIG. 1A shows the VTOL aircraft 101 comprising ducted fan assemblies 201a and 201b that are oriented to generate a lifting force. The generated lifting force is used to overcome the weight of the VTOL aircraft 101 and bring it into a hover above the ground.

FIG. 1B shows the VTOL aircraft 101 comprising ducted fan assemblies 201a and 201b that are oriented to generate forward thrust. Once the VTOL aircraft 101 is in a hover, ducted fan assemblies 201 produce thrust that propels the VTOL aircraft 101 forward into forward flight.

Figure 2A:
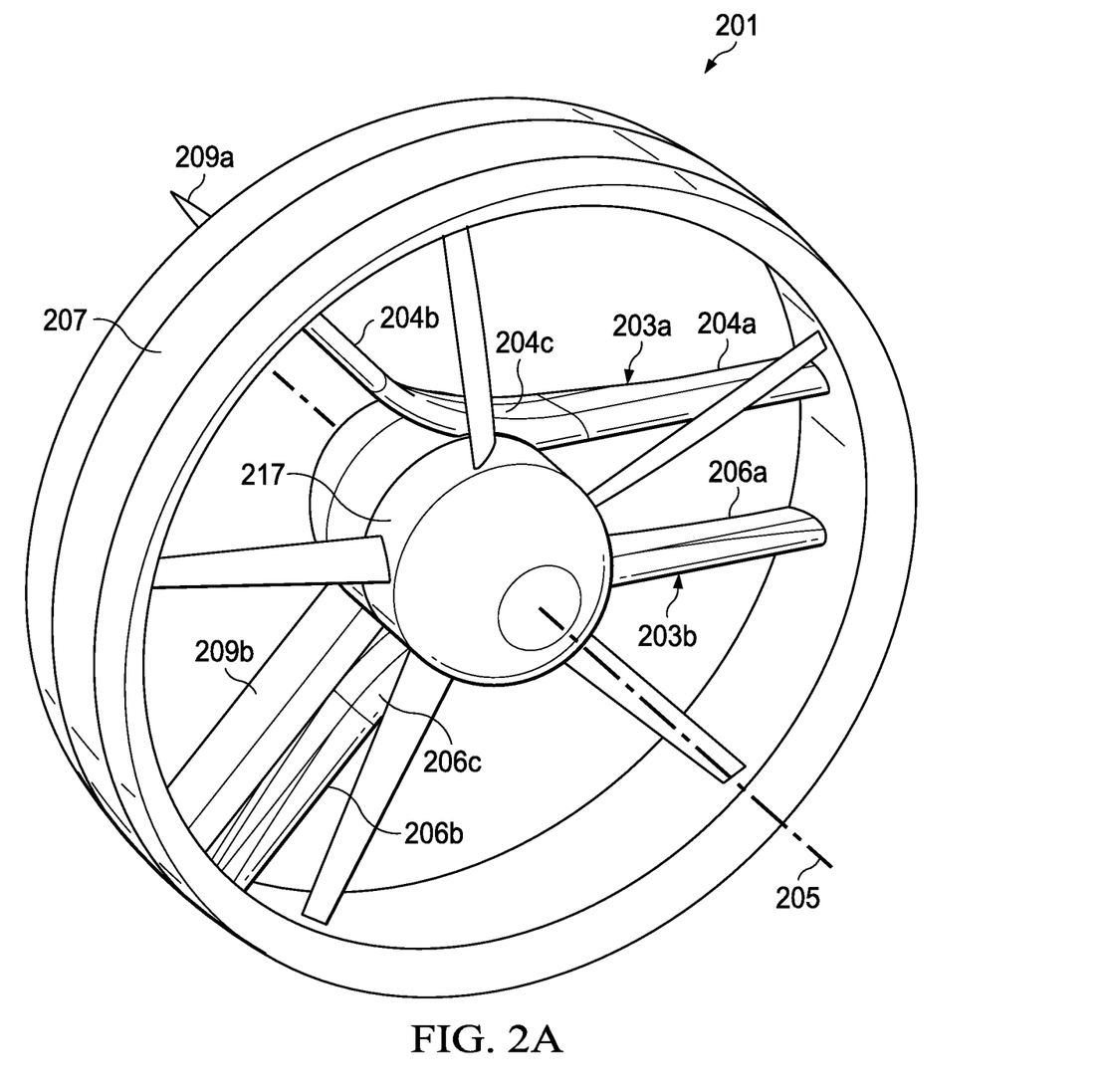
FIGS. 2A-2B are oblique views of a ducted fan assembly of VTOL aircraft of FIG.
Figure 2B:
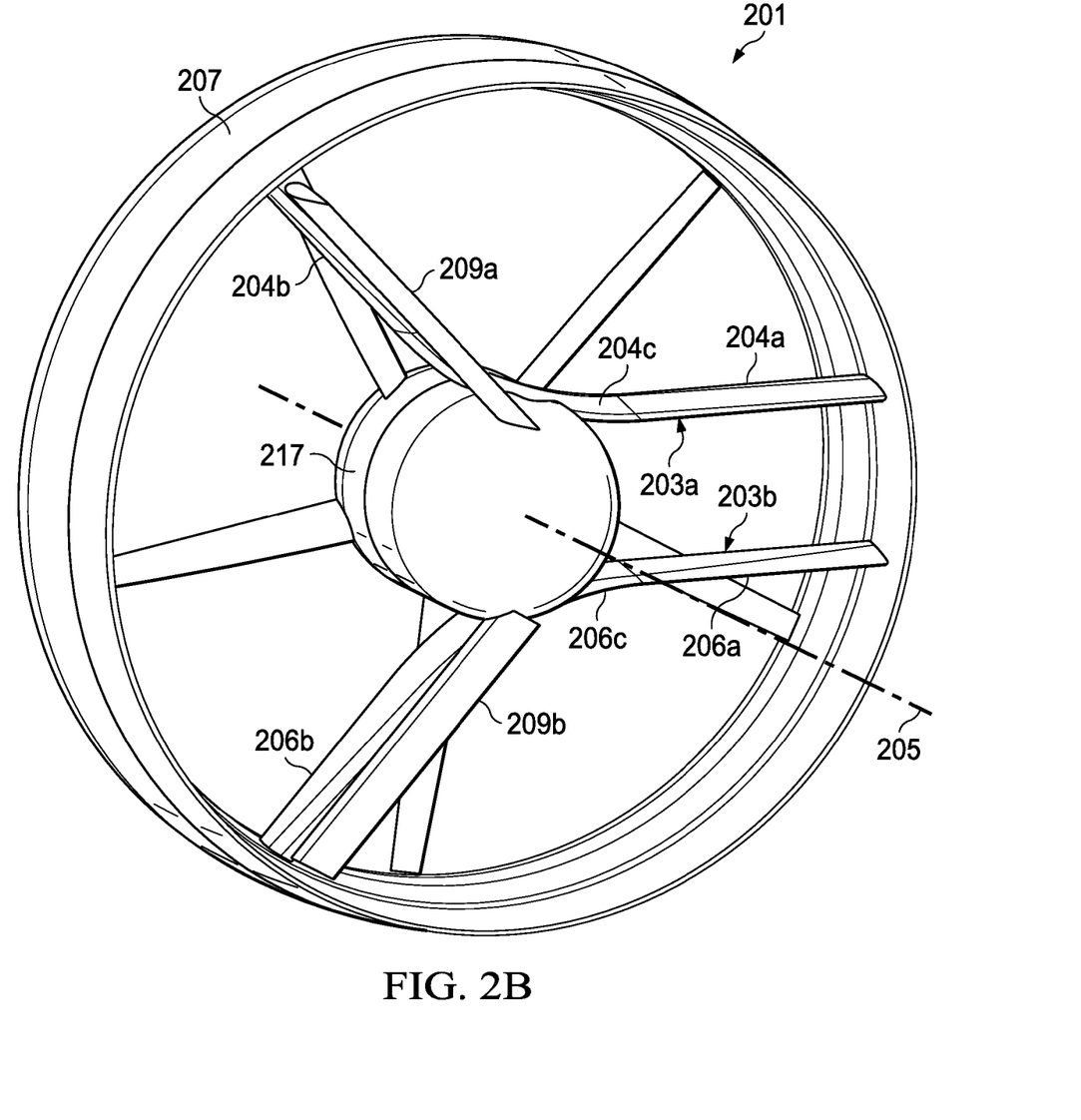
Figure 2C:
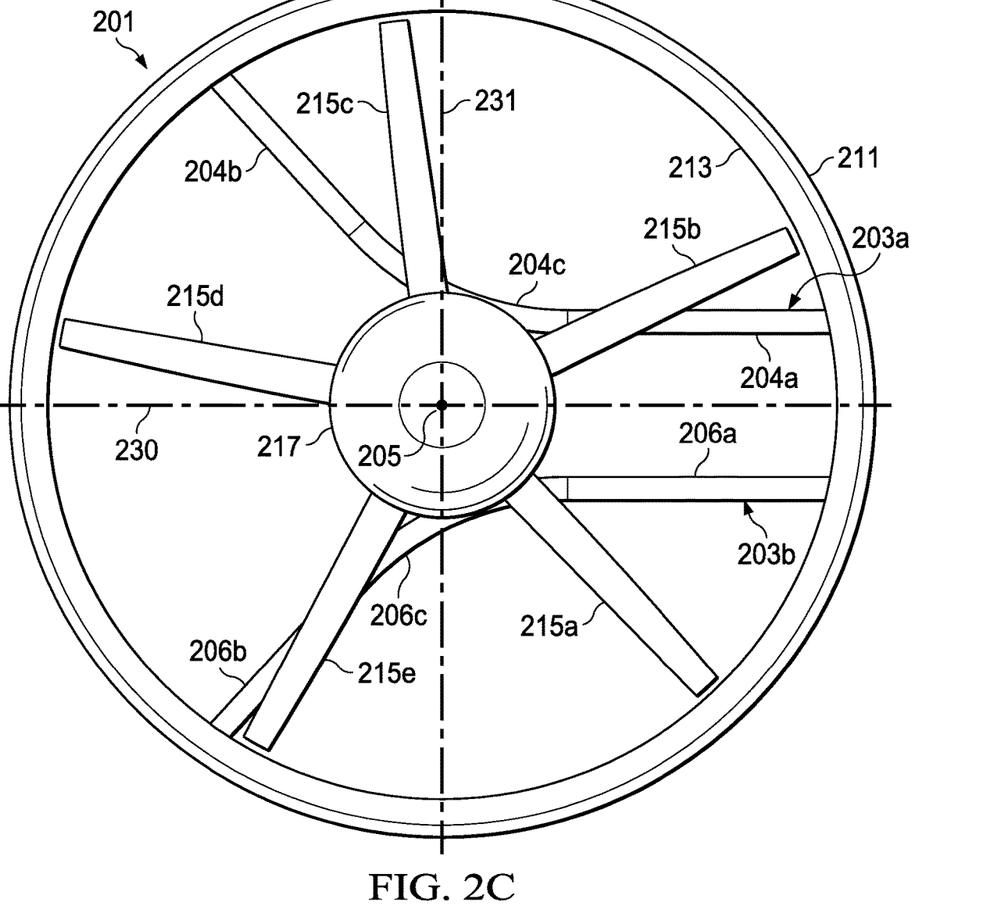
FIG. 2C is a top view of the ducted fan assembly of FIG. 2A.
Figure 2D:
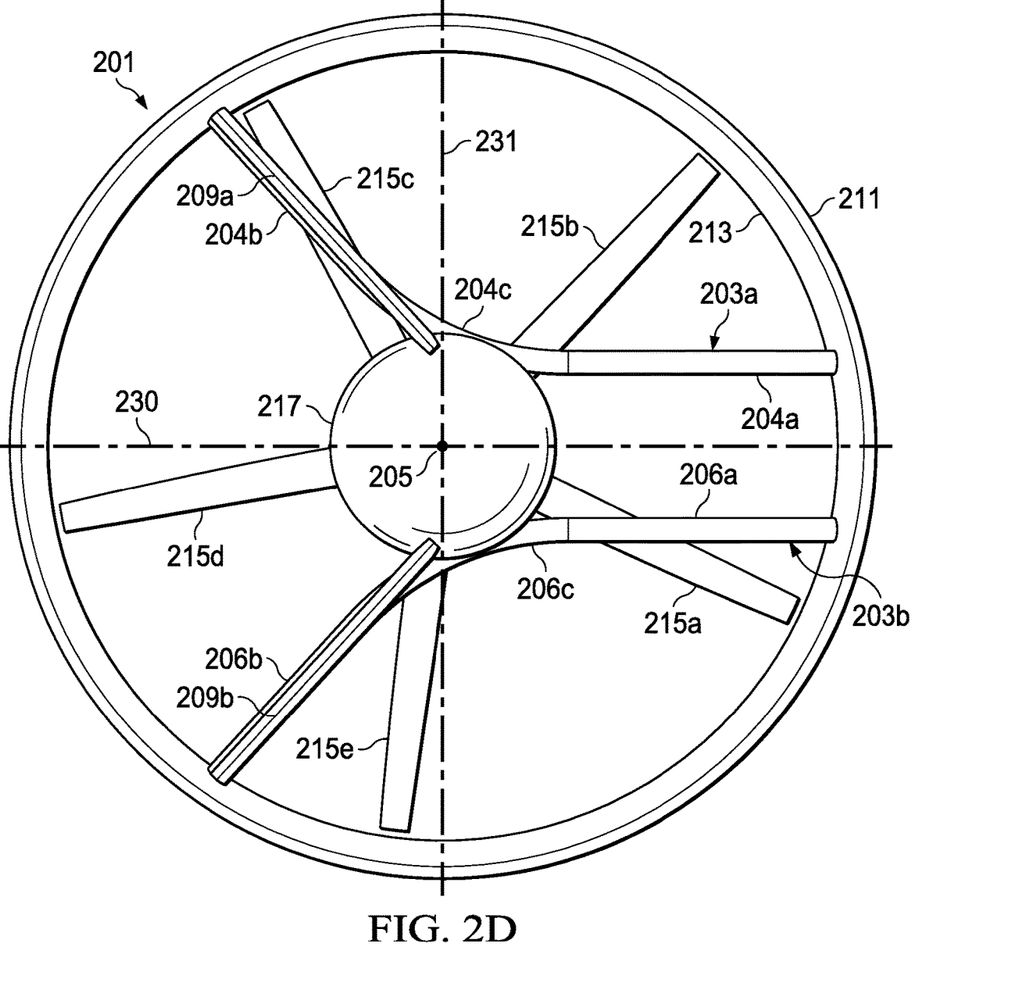
FIG. 2D is a bottom view of the ducted fan assembly of FIG. 2A.

Referring now to FIGS. 2A-2D, a ducted fan assembly 201 comprising curved stators 203a and 203b is schematically illustrated. FIGS. 2A and 2B show oblique views of the ducted fan assembly 201. FIGS. 2C and 2D show a top and bottom view, respectively, of the ducted fan assembly 201.

Referring to FIGS. 2A-2D, the ducted fan assembly 201 comprises a duct 207. The duct 207 comprises an inner wall 213 and an outer wall 211. In this embodiment, the remaining structure of the ducted fan assembly 201 is housed within a substantially cylindrical space defined by the duct 207.

A fan hub 217 is disposed at least partially along the central axis 205. The fan hub 217 is coupled to five fan blades 215a, 215b, 215c, 215d, and 215e and can comprise a motor or power source to rotate the fan blades 215a, 215b, 215c, 215d, 215e. The fan blades 215a, 215b, 215c, 215d, 215e each generally extend radially relative to the central axis 205 and are disposed in an evenly distributed angular array so that adjacent blades are substantially similarly angularly offset from each other.

The ducted fan assembly 201 further comprises two curved stators 203a and 203b that are coupled to the inner wall 213. The curved stators 203a and 203b are also coupled to the fan hub 217 and are used to hold the fan hub 217 in place, relative to the duct 207. The curved stators 203a and 203b are located downstream relative to the fan blades 215a, 215b, 215c, 215d, 215e, and within the airflow generated by the spinning fan blades 215a, 215b, 215c, 215d, 215e during operation.

In this embodiment, the curved stator 203a comprises a substantially straight inboard portion 204a, a substantially straight outboard portion 204b, and a curved portion 204c that joins the inboard portion 204a to the outboard portion 204b. Similarly, the curved stator 203b comprises a substantially straight inboard portion 206a, a substantially straight outboard portion 206b, and a curved portion 206c that joins the inboard portion 206a to the outboard portion 206b. Each of the curved portions 204c and 206c comprise an inflection point 227a at which a curved profile of the curved portions 204c, 206c transition from sloping upward (+) to sloping downward (−) or vice versa. In alternative embodiments, the entire body of a curved stator may comprise a curved profile, without substantially straight portions, which nonetheless comprises a point of inflection that demarks a general change in curvature direction of a body of the curved stator 203a. In the embodiment pictured in FIG. 3, the curved stator 203a curves angularly at a 112-degree angle. More generally, the curved stator 203a can be described as being coupled to the fan hub 217 at a hub interface 238a of the curved stator 203a, the hub interface 238a being located between the first end 219a and the second end 221a. In some cases, the hub interface can be associated with an overall lengthwise midpoint along the length of the curved stator 203a. Similarly, the curved stator 203b can be described as being coupled to the fan hub 217 at a hub interface 238b of the curved stator 203b, the hub interface 238b being located between the first end 219b and the second end 221b. In some cases, the hub interface can be associated with an overall lengthwise midpoint along the length of the curved stator 203b.

In the embodiment pictured in FIGS. 2A-2D, the curved stators 203a and 203b are bilaterally symmetrical to one another about the central axis 205. In other words, the ducted fan assembly 201 is identical about a plane 230 that is coincident with the central axis 205.

Two vanes 209a and 209b are located behind the two curved stators 203a and 203b, respectively. The vanes 209a and 209b are configured to selectively pivot about their axes, as shown in FIGS. 2A-2D, to perturb and direct airflow downstream of the fan blades 215a, 215b, 215c, 215d, 215e. The vanes 209a and 209b are rigidly coupled to the fan hub 217 and extend outward towards the inner wall 213. The vanes 209a and 209b extend along a portion of the length of and are coupled to the curved stators 203a and 203b, respectively, as shown in FIGS. 2A-2D.

Figure 3:
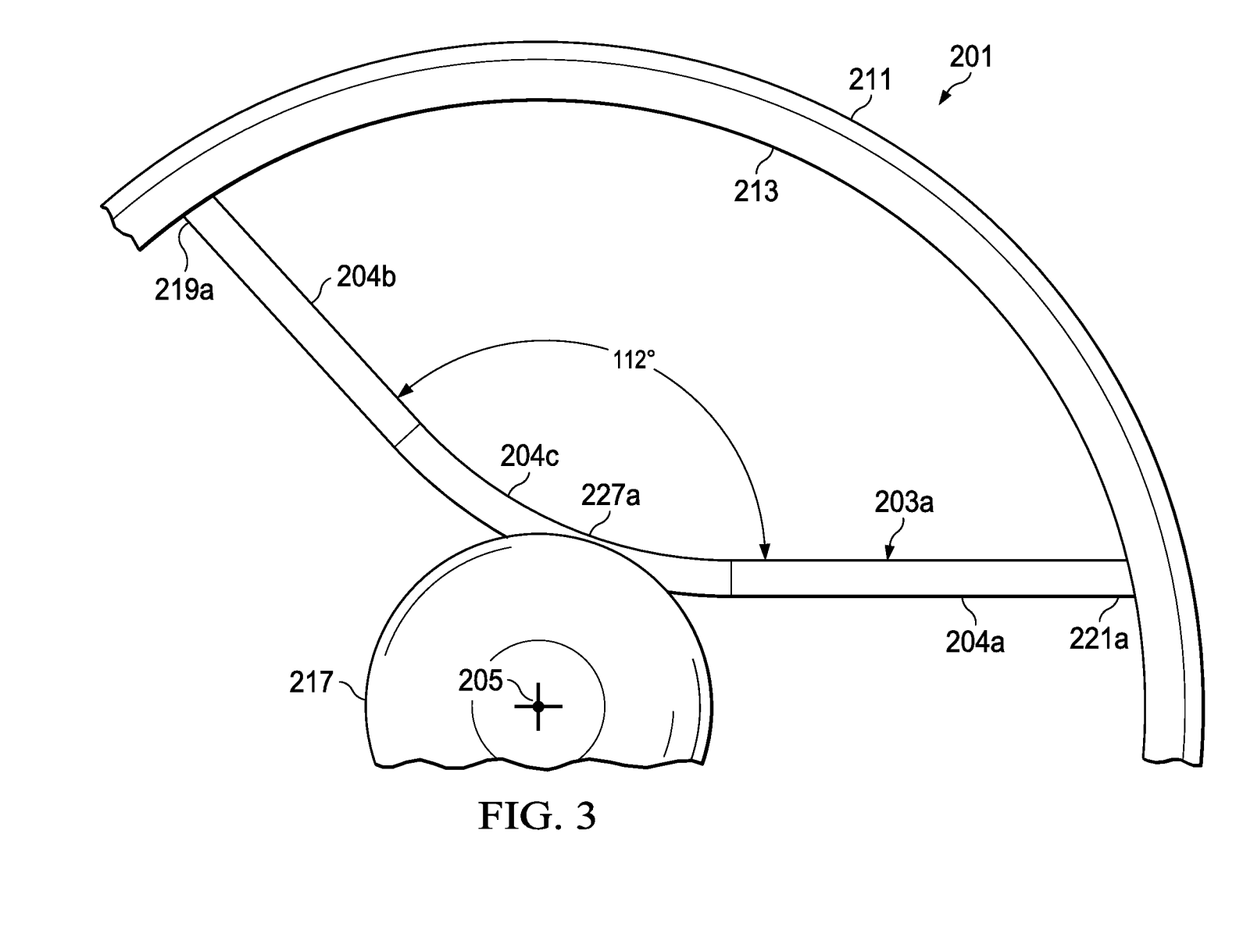
FIG. 3 is a close-up top view of the ducted fan assembly of FIG. 2A, showing the ducted fan assembly isolated from the fan blades and vanes for clarity.

Referring to FIG. 3, a close-up view of the curved stator 203a is shown that details how the curved stator 203a (and by extension the curved stator 203b) is coupled to the inner wall 213 and the fan hub 217. For clarity, fan blades 215a, 215b, 215c, 215d, 215e and the vanes 209a and 209b are omitted.

A first end 219a of the curved stator 203a is coupled to the inner wall 213. In this embodiment, the first end 219a is coupled to the inner wall 213 using a mechanical fastener. However, in alternative embodiments, the first end 219a and the inner wall 213 can be coupled using bolt assemblies, snap-fit assemblies, adhesive bonds, other common bonding methods, or in any other suitable manner. The second end 221a of the curved stator 203a is also coupled to the inner wall 213. Like with the first end 219a, there are multiple suitable alternative means by which the second end 221a can be coupled to the inner wall 213.

In this embodiment, the curved stator 203a is coupled to the fan hub 217 along the length of the curved portion 204c. In some embodiments, the connection of the curved stator 203a to the fan hub 217 can be substantially centered about the inflection point 227a. In this embodiment, the curved stator 203a is coupled to the fan hub 217 using a mechanical fastener. However, in alternative embodiments, the curved stator 203a and the fan hub 217 can be coupled using bolt assemblies, snap-fit assemblies, adhesive bonds, other common bonding methods, or in any other suitable manner. In part because the curved stator 203a and the fan hub 217 are coupled proximate to the curved stator's inflection point 227a, the curved stator 203a can effectively transfer forces and moments generated by the fan hub 217 away from the fan hub 217 to the surrounding structure.

In addition to transferring forces and moments generated by the fan hub 217, the curved stators 203a, 203b are situated to allow easy assembly and disassembly of the fan hub 217. More specifically, the fan hub 217 can be disassembled from the ducted fan assembly 201 by simply decoupling the fan hub 217 from the curved stators 203a, 203b. The fan hub 217 can then be repaired or replaced without disassembling the curved stators 203a, 203b from the ducted fan assembly 201. Instead, for example, the curved stator 203a can remain coupled to the inner wall 213 at the first end 219a and the second end 221a. The fan hub 217 can then be reassembled by recoupling the fan hub 217 with the curved stators 203a, 203b.

Figure 4:
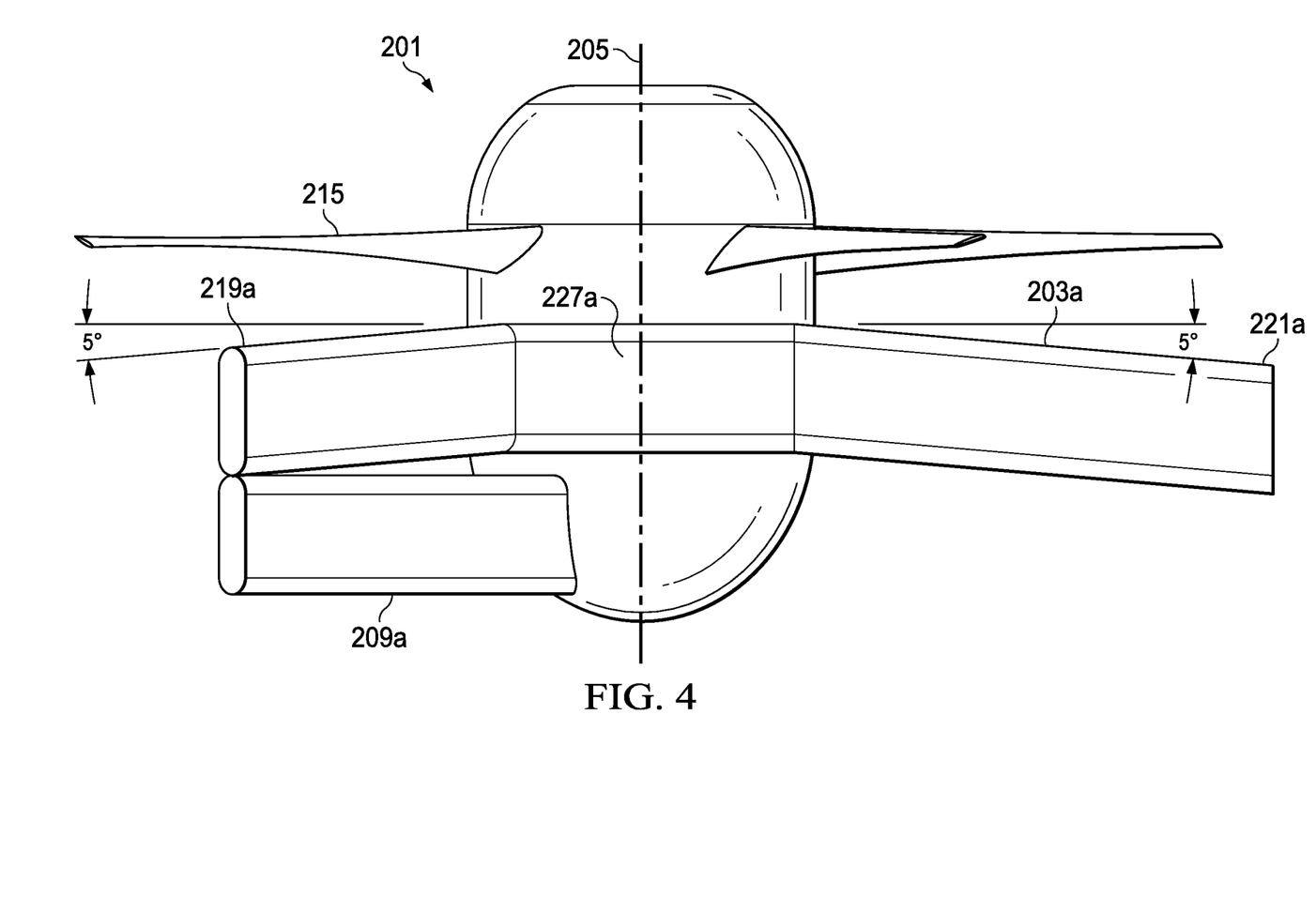
FIG. 4 is a side view of the ducted fan assembly of FIG. 2A, showing the ducted fan assembly isolated from the duct for clarity.

FIG. 4 illustrates a side view of the ducted fan assembly 201, wherein the duct 207 has been omitted for clarity. The curved stator 203b and vane 209b are also blocked from view. A vertical plane 231 runs through the center of the fan hub 217, proximate to the inflection points 227a and 227b of curved stators 203a and 203b, respectively. In this embodiment, the curved stators 203a and 203b both have 5-degrees of taper measured respectively from the inflection points 227a and 227b to the first ends 219a and 219b. Likewise, the curved stators 203a and 203b both have 5-degrees of taper measured respectively from the inflection points 227a and 227b to the second ends 221a and 221b. The curved stators' 203a and 203b profiles are aerodynamically shaped to better accommodate the airflow during operations. In alternative embodiments, curved stators can comprise airfoils comprising cambered profiles.

Figure 5:
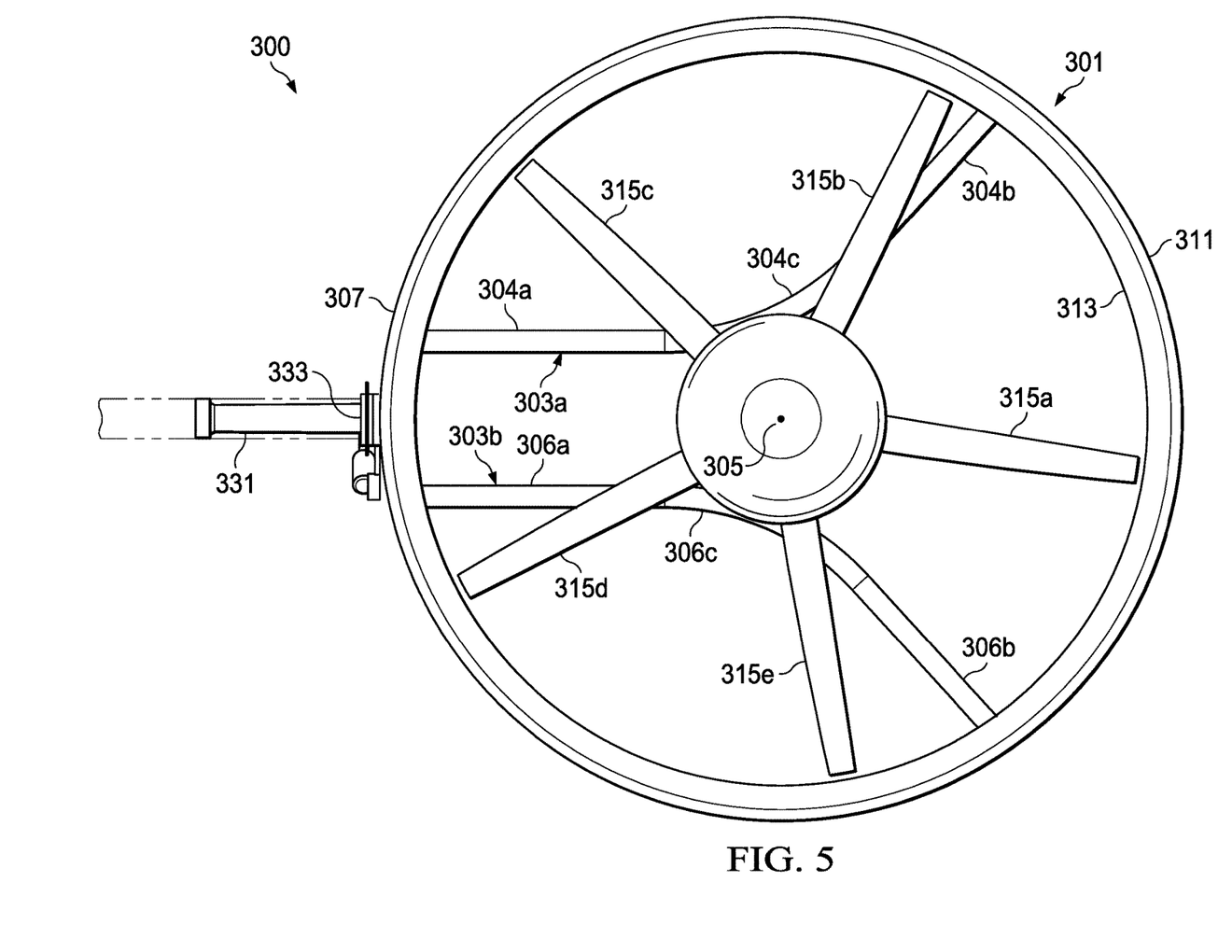
FIG. 5 is a schematic top view of a wing assembly of the present disclosure, showing a wing coupled with a ducted fan assembly.

FIG. 5 illustrates a wing assembly 300 comprising a wing 331 and a ducted fan assembly 301 with curved stators 303a and 303b. The ducted fan assembly 301 comprises a duct 307 comprising an inner wall 313 and an outer wall 311. The remaining structure of the ducted fan assembly 301 is disposed within a substantially cylindrical space defined by the duct 307.

The ducted fan assembly 301 comprises a central axis 305. The ducted fan assembly 301 also comprises a fan hub 317 and five fan blades 315a, 315b, 315c, 315d, and 315e. In this embodiment, the fan hub 317 is disposed substantially coaxially with the central axis 305 and is coupled to the five fan blades 315a, 315b, 315c, 315d, 315e. The fan blades 315a, 315b, 315c, 315d, 315e each generally extend radially relative to the central axis 305 and are disposed in an evenly distributed angular array so that adjacent blades are substantially similarly angularly offset from each other.

The ducted fan assembly 301 further comprises two curved stators 303a and 303b that are coupled to the inner wall 313. The curved stators 303a and 303b are also coupled to the fan hub 317 and are used to hold the fan hub 317 in place, relative to the duct 307. The curved stators 303a and 303b are located downstream relative to the fan blades 315a, 315b, 315c, 315d, 315e, and within the airflow generated by the spinning fan blades 315a, 315b, 315c, 315d, 315e during operation.

In this embodiment, the curved stator 303a comprises a substantially straight inboard portion 304a, a substantially straight outboard portion 304b, and a curved portion 304c that joins the inboard portion 304a to the outboard portion 304b. Similarly, the curved stator 303b comprises a substantially straight inboard portion 306a, a substantially straight outboard portion 306b, and a curved portion 306c that joins the inboard portion 306a to the outboard portion 306b. Each of the curved portions 304c and 306c comprise an inflection point 337a at which a curved profile of the curved portions 304c, 306c transition from sloping upward (+) to sloping downward (−) or vice versa. In alternative embodiments, the entire body of a curved stator may comprise a curved profile, without substantially straight portions, which nonetheless comprises a point of inflection that demarks a general change in curvature direction of a body of the curved stator 303a. In yet other alternative embodiments, a curved stator can comprise a plurality of straight portions that, while the portions are individually substantially straight, the straight portions nonetheless collectively provide a curvature to the overall profile of the curved stator.

A first end 319a of the curved stator 303a is coupled to the inner wall 313. In this embodiment, the first end 319a is coupled to the inner wall 313 using a mechanical fastener. However, in alternative embodiments, the first end 319a and the inner wall 313 can be coupled using bold assemblies, snap-fit assemblies, adhesive bonds, other common bonding methods, or in any other suitable manner. The second end 321a of the curved stator 303a is also coupled to the inner wall 313 using a mechanical fastener. Like with the first end 319a, there are multiple suitable alternative means by which the second end 321a can be coupled to the inner wall 313.

In this embodiment, the curved stator 303a is coupled to the fan hub 317 along the length of the curved portion 304c. In some embodiments, the connection of the curved stator 303a to the fan hub 317 can be substantially centered about the inflection point 337a. In this embodiment, the curved stator 303a is coupled to the fan hub 317 using a mechanical fastener. However, in alternative embodiments, the curved stator 303a and the fan hub 317 can be coupled using bolt assemblies, snap-fit assemblies, adhesive bonds, other common bonding methods, or in any other suitable manner. In part because the curved stator 303a and the fan hub 317 are coupled proximate to the curved stator's point of inflection 327a, the curved stator 303a can effectively transfer forces and moments generated by the fan hub 217 away from the fan 317 to the surrounding structure. More generally, the curved stator 303a can be described as being coupled to the fan hub 317 at a hub interface 338a of the curved stator 303a, the hub interface 338a being located between the first end 319a and the second end 321a. In some cases, the hub interface can be associated with an overall lengthwise midpoint along the length of the curved stator 303a. More generally, the curved stator 303b can be described as being coupled to the fan hub 317 at a hub interface 338b of the curved stator 303b, the hub interface 338b being located between the first end 319b and the second end 321b. In some cases, the hub interface can be associated with an overall lengthwise midpoint along the length of the curved stator 303b.

Figure 6:
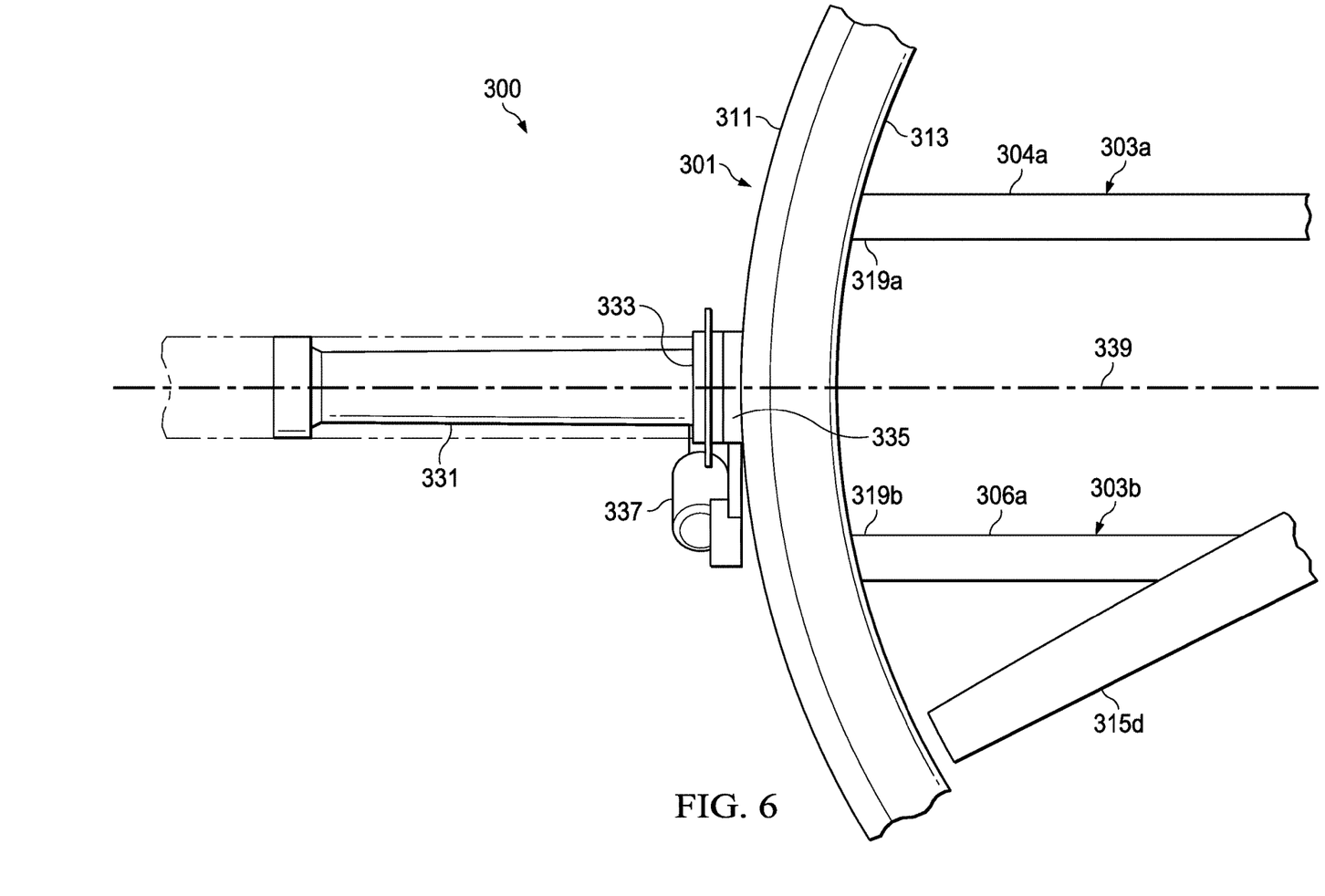
FIG. 6 is a close-up top view of the wing assembly of FIG. 5.

Referring to FIG. 6, a close-up view of a pivot joint 335 is provided. The pivot joint 335 is used to couple the outer wall 311 with a wing tip 333. The pivot joint 335 allows the ducted fan assembly 301 to selectively rotate about a pivot joint axis 339. The pivot joint axis 339 extends through the center of the pivot joint 335 and intersects the central axis 305. As shown in FIG. 5, the ducted fan assembly 301 is configured to produce forward thrust force; but the pivot joint 335 allows the ducted fan assembly 301 to pivot about the pivot joint axis 339 to produce a lifting force, or a combination thereof.

Still referring to FIG. 6, the pivot joint 335 is attached to an actuator 337 that is used to mechanically pivot the ducted fan assembly 301 about the pivot joint axis 339. The pivot joint 335 is coupled to the outer wall 311 at an angular location along the outer wall 311 adjacent to and between the curved stators' first ends 319a and 319b, so that the curved stators 303a and 303b are bilaterally symmetric about the pivot joint axis 339.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:
1. A ducted fan assembly, comprising:
   a central axis;
   a duct, the duct comprising:
      an outer wall; and
      an inner wall;
   a fan hub at least partially disposed on the central axis;
   a plurality of fan blades coupled to the fan hub;
   a first stator, the first stator comprising:
      a first end coupled to the inner wall;
      a second end coupled to the inner wall; and a hub interface disposed between the first end and the second end, wherein the hub interface is coupled to the fan hub;
a second stator, the second stator comprising:
a first end coupled to the inner wall;
a second end coupled to the inner wall; and
a hub interface disposed between the first end of the second stator and the second end of the second stator, wherein the hub interface of the second stator is coupled to the fan hub;
wherein the first end of the first stator and the first end of the second stator are angularly offset relative to each other about the central axis by a first angular value and wherein the second end of the first stator and the second end of the second stator are angularly offset relative to each other about the central axis by a second angular value that is greater than the first angular value;
wherein each of the first stator and the second stator comprise a concave curvature that is open away from the central axis; and
wherein the duct is rotatable about a spindle axis relative to a fuselage that carries the duct.

2. The ducted fan assembly according to claim 1, wherein the first stator comprises a curved portion that comprises the hub interface.

3. The ducted fan assembly according to claim 1, wherein the first stator and the second stator are bilaterally symmetrical to one another about a plane through the central axis.

4. The ducted fan assembly according to claim 3, wherein the second stator comprises a curved portion that comprises the hub interface.

5. The ducted fan assembly according to claim 1, wherein a vane is coupled to the fan hub and extends radially outward toward the inner wall.

6. The ducted fan assembly according to claim 5, wherein the vane is coupled to and runs partially along a length of the first stator.

7. The ducted fan assembly according to claim 2, wherein the curved portion of the first stator angularly curves in an obtuse angle.

8. The ducted fan assembly according to claim 7, wherein the curved portion of the first stator angularly curves at a 112-degree angle.

9. The ducted fan assembly according to claim 1, wherein the first stator is tapered from the first end to a lengthwise midpoint and is tapered from the second end to the midpoint.

10. The ducted fan assembly according to claim 9, wherein the first stator comprises 5 degrees of taper from the first end to the midpoint and 5 degrees of taper from the second end to the midpoint.

11. The ducted fan assembly according to claim 1, wherein the ducted fan assembly comprises five fan blades.

12. The ducted fan assembly according to claim 11, wherein each of the five fan blades are angularly spaced evenly apart from one another.

13. A method for assembling and disassembling a fan hub from a ducted fan assembly, the method comprising: providing a ducted fan assembly, comprising: a central axis; a duct, the duct comprising: an outer wall; and an inner wall; a fan hub at least partially disposed on the central axis; a plurality of fan blades coupled to the fan hub; a first stator, the first stator comprising: a first end coupled to the inner wall; a second end coupled to the inner wall; and a hub interface disposed between the first end and the second end, wherein the hub interface is coupled to the fan hub; and a second stator, the second stator comprising: a first end coupled to the inner wall; a second end coupled to the inner wall; and a hub interface disposed between the first end of the second stator and the second end of the second stator, wherein the hub interface of the second stator is coupled to the fan hub; wherein the first end of the first stator and the first end of the second stator are angularly offset relative to each other about the central axis by a first angular value and wherein the second end of the first stator and the second end of the second stator are angularly offset relative to each other about the central axis by a second angular value that is greater than the first angular value; and wherein the duct is rotatable about a spindle axis relative to a fuselage that carries the duct; and wherein each of the first stator and the second stator comprise a concave curvature that is open away from the central axis; and coupling or decoupling the fan hub relative to the hub interface without decoupling the first stator from the inner wall and without decoupling the duct from the fuselage that carries the duct.

14. The method of claim 13, wherein the hub interface is disposed on a curved portion of the first stator and wherein the fan hub is coupled or decoupled from the curved portion without decoupling the first end from the inner wall and without decoupling the second end from the inner wall.

* * * * *